UNITED STATES PATENT OFFICE.

REINHOLD GRÜTER, OF CHARLOTTENBURG, GERMANY.

MIXTURE SUITABLE FOR BAKING-POWDER.

1,024,330.

Specification of Letters Patent. Patented Apr. 23, 1912.

No Drawing. Application filed December 2, 1911. Serial No. 663,548.

*To all whom it may concern:*

Be it known that I, REINHOLD GRÜTER, a citizen of the German Empire, residing at Windscheidstrasse 18, Charlottenburg, Germany, have invented certain new and useful Improvements in Mixtures Suitable for Baking-Powder, of which the following is a specification.

With baking powders which as well known consist partly of carbonates, partly of acid substances it is particularly essential that the following conditions are adhered to: The mixture must possess as great a storing capacity as possible; furthermore it is of great value that the development of carbonic acid only takes place at higher temperatures, and finally that the development of carbonic acid must be great and at the same time uniform during the baking process. It has been tried to fullfil in various manners these conditions; but no one has succeeded so far in producing in a simple manner a mixture which together with the high percentage of carbonic acid and sufficient cheapness possesses all the properties named. I have found, that such mixtures are obtained by mixing anhydrids, respectively the esters of organic oxyacids with carbonates or bicarbonates. These mixtures are resistant to the atmosphere; they develop on being prepared with the cold dough no carbonic acid or only little, but only react at a higher baking temperature. In this case carbonic acid develops itself to a great extent and uniformly. Such anhydric derivates of the oxy-acids are for instance glycolacidanhydrid, glycolid and polyglycolid, anhydrid of lactic acid, lactid. Also esters of other acids with oxy-acids may be employed.

To the acid derivates of the oxy-acids belong for instance acetyl-lactic acid as well as the esters of carbonic acid. In place of the anhydrized acid substances also their salts may be applied in as far as free acids are present.

58 parts of glycolid or 73 parts of lactid or a corresponding quantity of another of the anhydrids above named are mixed with 78 parts of bicarbonate of sodium. In place of bicarbonate of sodium as a matter of course salts of carbonic acid, mainly the carbonates of the alkalis, alkaline earths and ammonium may be applied; also diluting means may be added as is the case with the usual baking powders.

Glycolic acid and its homologues have the property to evaporate together with aqueous vapors; thereby a uniform gradual distribution of the acid is effected.

I claim:

1. The herein described baking powder, the constituents of which react only at the higher temperature obtained in baking and which consists of a mixture of anhydrous organic oxy-acids and a salt of carbonic acid.

2. The herein described baking powder, the constituents of which react only at the higher temperature obtained in baking and which consists of a mixture of the anhydrous acid derivatives of organic oxy-acids and a salt of carbonic acid.

In testimony whereof I affix my signature in presence of two witnesses.

REINHOLD GRÜTER.

Witnesses:
HENRY HASPER,
WOLDEMAR HAUPT.